Aug. 10, 1965  J. W. BORGER  3,199,925
PNEUMATIC OR GRAVITY DISCHARGE HOPPER ARRANGEMENT
Original Filed Jan. 10, 1962
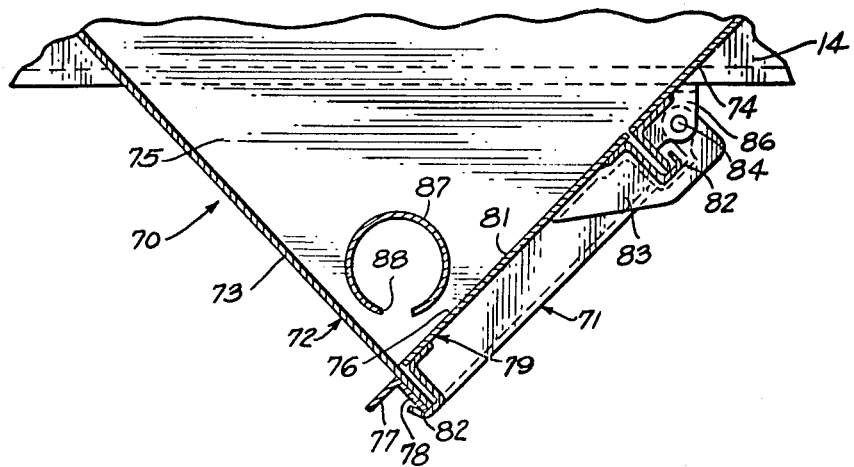
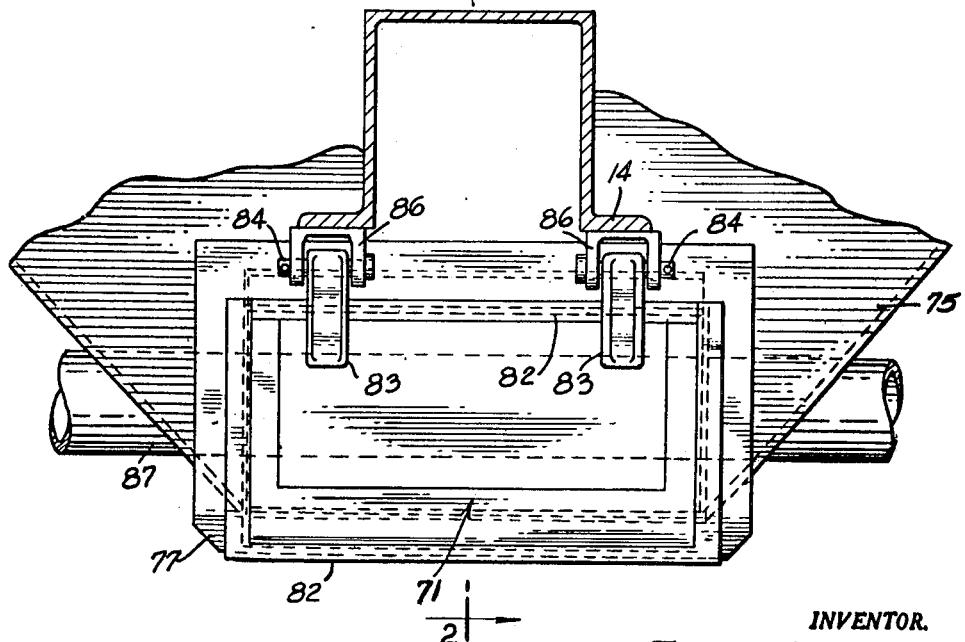
INVENTOR.
JACK W. BORGER 3,199,925
PNEUMATIC OR GRAVITY DISCHARGE HOPPER ARRANGEMENT
Jack W. Borger, Calumet City, Ill., assignor to Pullman Incorporated, a corporation of Delaware
Original application Jan. 10, 1962, Ser. No. 165,429, now Patent No. 3,153,558, dated Oct. 20, 1964. Divided and this application Jan. 2, 1964, Ser. No. 346,583
1 Claim. (Cl. 302—52)

The present invention relates to discharge arrangements for unloading hopper type vehicles and is a division of the invention of my application Serial No. 165,429 filed January 10, 1962, now Patent No. 3,153,-558, granted October 20, 1964.

Pneumatic conveying systems are sommonly employed for transporting pulverulent, granular or finely divided material, such as grain, cement, plastics, malt and the like from the hopper-type vehicles to suitable storage receptacles. To accommodate the hopper-type vehicles to such pneumatic conveying systems, the hoppers at their lower discharge end are generally provided with a pneumatic feed structure comprising generally sloping side sheets fastened to the hopper and an outlet connectable to the one end of a flexible suction tube of the pneumatic conveying system.

In the handling of finely divided solids of the type and kind described above, difficulties are oftentimes encountered in maintaining a uniform maximum flow through the pneumatic discharge structure. Of particular difficulty is the problem of the tendency of materials to clog and bridge within the outlet so that the flow of material is restricted to a rate far below the desired maximum or the flow of material may be entirely cut off.

It is a principal object of the present invention to provide a new and improved pneumatic feed structure for attachment to a hopper constructed and arranged so as to maintain a maximum rate of feed therethrough and preclude the clogging and bridging difficulties encountered heretofore.

It is a further object to provide a pneumatic feed structure for attachment to a hopper constructed and arranged to include a material-conveying tube which is provided with material inlet means arranged so that a minimum air space is maintained within the tube to achieve a maximum rate of feed of the material without clogging or bridging.

A still further object is to provide a new and improved pneumatic feed structure incorporating, as a component thereof, means for permitting optional gravity discharge of the material.

Further objects and features will hereinafter appear.

In the drawings:

FIG. 1 is a fragmentary elevational view of the lower end of a hopper and a discharge device including pneumatic discharge means and gravity discharge means; and FIG. 2 is a fragmentary cross-sectional view taken substantially along the lines 2—2 of FIG. 1.

Referring now to FIGS. 1 and 2, there is shown a pneumatic discharge device 70, including as a component thereof, a gravity discharge arrangement 71 below the center sill 14. The device includes a substantially V-shaped housing 72 having sloping side walls 73 and 74 converging toward a nadir and spaced end walls 75 suitably fixed to the side walls as by welding. The bottom edge of the side wall is spaced from the nadir to provide a gravity discharge opening 76. Bounding the openings 76 and fixed to the side sheets are angle members 77 arranged to provide outwardly projecting legs 78.

Covering the opening 76 is a gate 78 including a plate 81 which in the closed position forms a continuation of the side wall 74. Secured about the periphery of the plate are Z-shaped angle members of which the outer leg is crimped adjacent its free end to form a hook-like rim 82 which in the closed position of the gate receives the projecting legs 78 of the angle members 77. Fixed to the upper edge of the plate 81 is a pair of spaced hinge plates 83 which extend about and over the rim strip 82 and are pivotally attached by hinge pins 84 fixed to clevis-type hinge pins 86 carried advantageously on the underside of the center sill 14 of the railway car.

A cylindrical tube 87 extends through the discharge device housing 72 in spaced relation to the converging side walls 73 and 74 and the nadir of the housing 72. The lower or bottom portion of the tube 87 is provided with a longitudinally extending continuous material-receiving slot 88 through which material is introduced into the tube during pneumatic unloading.

For gravity discharge, the plate 81 is swung downwardly with the edge of the angle brace 83 in engagement with a surface portion of the rim strip 82 providing a pivot point in cooperation with the hinge pins 86 so that gravity discharge occurs through the opening 76. In the closed condition of the plate, the edge of the angle 77 engaging the interior of the rim strip 82 serves as a seal to prevent loss of material therethrough. The plate may be locked in its closed position by any suitable means, such as a conventional car seal (not shown).

During pneumatic unloading of the material wherein the gate 71 is closed, the material flows upwardly into the conduit and longitudinally therethrough when attached to a suction at one end of the tube (not shown). It is to be noted that the upper portion of the tube 87 provides for baffling the gravity influenced material in the hopper so that an air space is maintained in the tube at all times.

What is claimed is:

An apparatus for conveying granular material from a hopper by way of a pneumatic feed system employing a suction comprising an attachment including a substantially V-shaped housing having end walls and converging side walls, a tubular feed member extending through said housing and between the end walls thereof and being spaced from the converging side walls and the nadir of said housing, an opening provided in said tubular member between said end walls opposing said nadir, said tubular member including an outlet end projecting from one of said end walls being adapted to be connected to said suction means, and gravity discharge means including an opening formed in one of said converging side walls and gate disposed over said opening and forming a continuation of said one converging side wall when in a closed position.

References Cited by the Examiner

UNITED STATES PATENTS

| 2,303,810 | 12/42 | Anderson | 302—52 |
| 2,919,158 | 12/59 | Aller | 302—52 |
| 3,069,207 | 12/62 | Borger | 302—52 |
| 3,088,776 | 5/63 | Aller | 302—52 |

SAMUEL F. COLEMAN, *Primary Examiner.*

ANDRES H. NIELSEN, *Examiner.*